United States Patent
Sharifi Mehr

(10) Patent No.: US 11,019,089 B1
(45) Date of Patent: May 25, 2021

(54) PERFORMING SECURITY ASSESSMENTS BASED ON USER CREDENTIALS

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 15/906,969

(22) Filed: Feb. 27, 2018

(51) Int. Cl.
*H04L 29/06* (2006.01)

(52) U.S. Cl.
CPC ...... *H04L 63/1433* (2013.01); *H04L 63/1441* (2013.01); *H04L 63/20* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 9,092,782 | B1* | 7/2015 | Zaslavsky | G06F 21/577 |
| 9,537,884 | B1* | 1/2017 | Raugas | H04L 63/1433 |
| 2009/0007270 | A1* | 1/2009 | Futoransky | H04L 63/1433 726/25 |
| 2013/0347085 | A1* | 12/2013 | Hawthorn | H04L 63/1433 726/6 |
| 2015/0215332 | A1* | 7/2015 | Curcic | H04L 63/1433 726/25 |
| 2015/0242636 | A1* | 8/2015 | Khan | G06F 21/577 726/25 |
| 2016/0134653 | A1* | 5/2016 | Vallone | H04L 41/046 726/25 |
| 2016/0352771 | A1* | 12/2016 | Sivan | H04L 63/1433 |
| 2017/0006055 | A1* | 1/2017 | Strom | G06F 30/20 |
| 2017/0060102 | A1* | 3/2017 | Sargolzaei | G05B 13/021 |
| 2017/0230402 | A1* | 8/2017 | Greenspan | H04L 63/1433 |
| 2017/0244743 | A1* | 8/2017 | Key | H04L 63/20 |
| 2018/0007087 | A1* | 1/2018 | Grady | H04L 63/0428 |
| 2018/0046811 | A1* | 2/2018 | Andriani | H04L 63/1425 |
| 2018/0054429 | A1* | 2/2018 | Donahue | G06F 21/577 |
| 2018/0096153 | A1* | 4/2018 | DeWitte | G06F 21/552 |
| 2018/0219903 | A1* | 8/2018 | Segal | G06F 21/577 |
| 2018/0239902 | A1* | 8/2018 | Godard | G06F 21/53 |
| 2018/0295154 | A1* | 10/2018 | Crabtree | G06N 20/00 |

(Continued)

OTHER PUBLICATIONS

Baluta, Teodora; Ramapantulu, Lavanya; Teo, Yong Meng; Chang, Ee-Chien; "Modeling the Effects of Insider Threats on Cybersecurity of Complex Systems", Winter Simulation Conference (WSC), IEEE, Dec. 3-6, 2017, pp. 4360-4371.*

(Continued)

*Primary Examiner* — Victor Lesniewski
(74) *Attorney, Agent, or Firm* — Knobbe, Martens, Olson & Bear, LLP

(57) ABSTRACT

A security assessment service for implementing security assessments based on security credentials utilized to access network-based services. The system implements security assessments associated with various actions attributed to different types of techniques that can be utilized for compromised security information. The processing result of the security assessment can be utilized to determine the result of the techniques associated with the security assessment, the performance of security monitoring services, and an anticipated result on a virtual network.

19 Claims, 7 Drawing Sheets

(56) References Cited

U.S. PATENT DOCUMENTS

| | | | | |
|---|---|---|---|---|
| 2018/0309780 | A1* | 10/2018 | Damodaran | H04L 63/1433 |
| 2018/0336355 | A1* | 11/2018 | Agarwal | H04L 63/1441 |
| 2018/0357422 | A1* | 12/2018 | Telang | G06F 21/577 |
| 2019/0056722 | A1* | 2/2019 | Abbaszadeh | H04L 63/1433 |
| 2019/0068631 | A1* | 2/2019 | Ashkenazy | H04L 63/1433 |
| 2019/0081974 | A1* | 3/2019 | Lasser | H04L 63/20 |
| 2019/0171822 | A1* | 6/2019 | Sjouwerman | G06F 30/20 |
| 2019/0182286 | A1* | 6/2019 | Zini | H04L 61/256 |
| 2019/0238583 | A1* | 8/2019 | Vaidya | H04L 63/1491 |
| 2019/0258953 | A1* | 8/2019 | Lang | G06N 5/025 |
| 2019/0260777 | A1* | 8/2019 | Mehrotra | H04L 63/08 |

OTHER PUBLICATIONS

Kotenko, Igor; Doynikova, Elena; "The CAPEC Based Generator of Attack Scenarios for Network Security Evaluation", 8th International Conference on Intelligent Data Acquisition and Advanced Computing Systems: Technology and Applications (IDAACS), IEEE, Sep. 24-26, 2015, pp. 436-441.*

Aggarwal, Palvi; Gonzalez, Cleotilde; Dutt, Varun; "Modeling the Effects of Amount and Timing of Deception in Simulated Network Scenarios", International Conference on Cyber Situational Awareness, Data Analytics and Assessment (Cyber SA), IEEE, Jun. 19-20, 2017, 7 pages.*

* cited by examiner

PERFORMING SECURITY ASSESSMENTS BASED ON USER CREDENTIALS

BACKGROUND

Generally described, computing devices and communication networks can be utilized to exchange information. In a common application, a computing device can request content from another computing device via the communication network. For example, a user at a personal computing device can utilize a browser application to request a content page (e.g., a network page, a Web page, etc.) from a server computing device via a network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers also provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
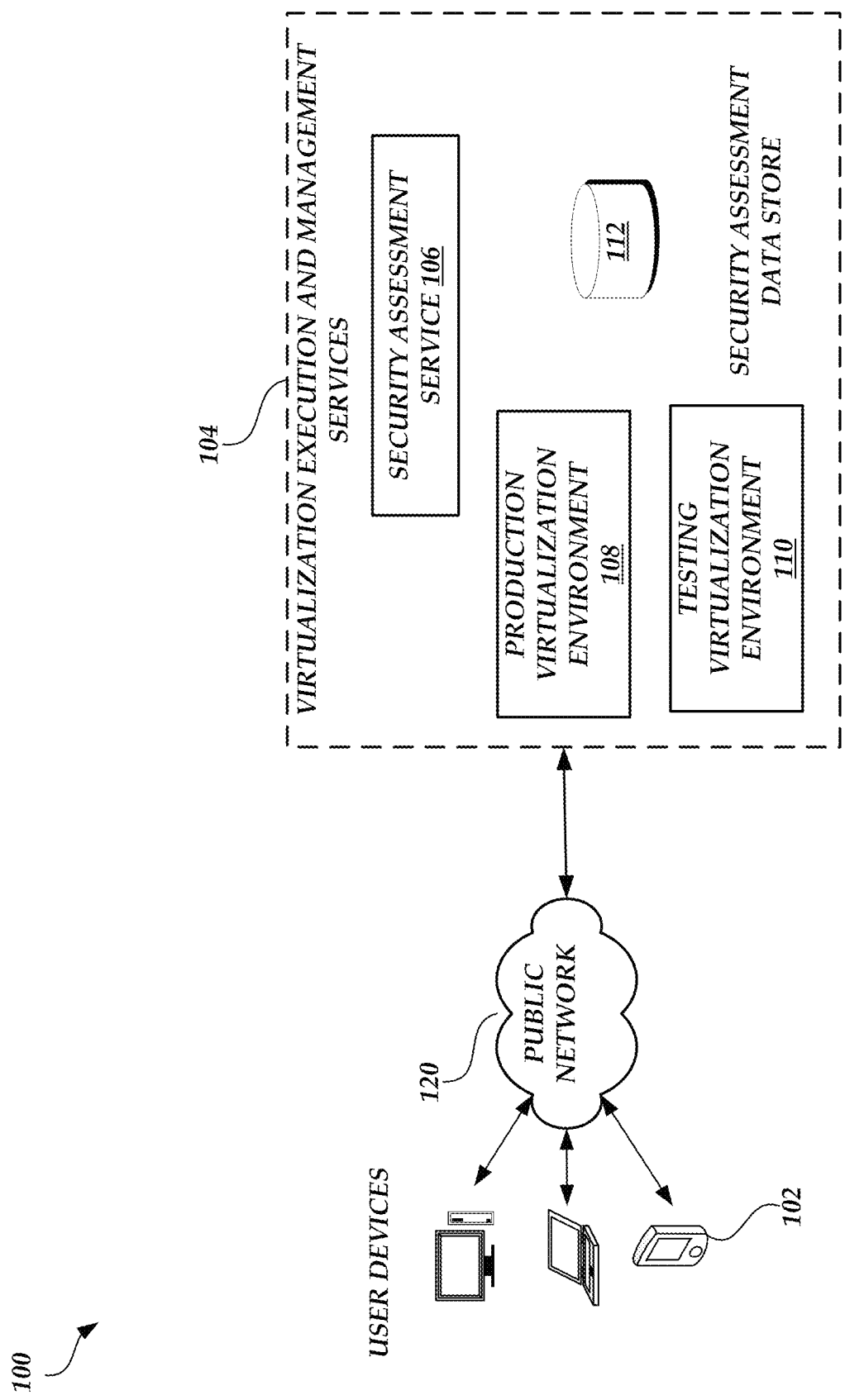
FIG. 1 is a block diagram of a communication environment that includes one or more user devices and virtualization execution and management services.

Generally described, service providers can make network-based services available to customers. Often, the service providers can utilize or leverage virtualization technologies to facilitate the configuration of specialized functions on virtual machine instances hosted on physical machines maintained by or on behalf of the service providers. For example, a customer can request and provide configurations for a desired database server, web server, and the like, which can be implemented in one or more virtual machine instances. Still further, in some embodiments, service providers can host multiple virtual machines instances organized and configured as a virtual network on behalf of customers.

To access virtualization or other services provided by service providers, customers typically are given security information, such as user identifiers, credentials, passwords, etc., that can be utilized to access, request, modify or otherwise implement services. In situations in which such security information is compromised, third-parties can utilize the compromised security information to manipulate existing services previously accessed by a customer, request or modify new services, or attempt to leverage the security information to gain additional access to information from the customer or service provider.

In some embodiments, service providers can attempt to assess the potential vulnerability of a customer or service provider in the event of compromised security information. Such attempts traditionally related to the utilization of simulations that simulate potential attacks based on compromised security information and attempt to instrument or label the results for further analysis. However, such attempts can be inefficient or inaccurate in that simulated systems often cannot replicate actual response of an actual system. For example, traditional simulated systems do not typically model a combination of potential attacks or efforts to evade detection of attacks. Additionally, simulated attacks may not generate sufficient data, such as label data, to allow for adequate analysis or suggestion of remedial steps. Accordingly, traditional security assessment approaches are inefficient or ineffective, which can lead to continued vulnerabilities in network-based services or results in less efficient network-based services based on exploited compromised security information.

Aspects of the present application correspond to a system and method for performing security assessments based on security information. More specifically, aspects of the present application relate to a system for configuring a set of security assessments based on a security information to determine vulnerabilities for different types of techniques for exploiting security information. The security information can illustratively include user identifiers, passwords, credentials, tokens, etc. that can be compromised based on key logging, network intrusion, phishing attacks, and the like. The system facilitates the management of workflows corresponding to the implementing of a plurality of security assessments in accordance with a specific order and in accordance with specific timing.

In one embodiment, individual security assessments correspond to the implementation of executable code, such as scripts, that implement a defined security assessment to assess the potential vulnerability and result of a technique. The security assessments can illustratively be organized according to variations of identifiable techniques including, but not limited to, detection and evasion techniques, escalation techniques, data exfiltration techniques, infrastructure sabotage techniques, and the like. Each of the identified techniques can further be defined to specific actions that can be implemented to test for specific vulnerabilities. For example, a security assessment service can be configured to utilize the security information to assume administrative roles for a hosted virtual machine instance or network and generate various service calls from the assumed administrative roles that can further expose the virtual machine or network. In another example, a security assessment service can be configured to utilize security information create additional user identifiers and security information and use the newly created identifiers and security information to avoid detection or continue vulnerability exploitation. As will be described below, security assessments may be managed and implemented as a workflow that facilitates various combinations of security assessments from the same identifiable technique or from different identifiable techniques.

To execute individual security assessments, a security assessment service can either execute the security assessment on a hosted virtual machine or virtual network. Alternatively, the security assessment service can utilize additional physical host computing devices to implement a working copy of an identified hosted virtual machine or virtual network and assess the impact of the security assessment on the working copy without exposing the actual hosted virtual machine or hosted network to the results of the hosted virtual network. The security assessment service can then generate processing results and generate summaries of the execution of security assessment, the performance of monitoring or security configurations, and a resulting impact on the hosted virtual machine instance or hosted virtual network.

Illustratively, the present application will be described with regard to specific types/techniques of security assessments and numerous examples of specific security assessments corresponding to the identified types/techniques. One skilled in the relevant art will appreciate that the present application is not limited to any particular security assessment type or that particular security assessment types are solely limited to the specific examples of security assessments identified for each security assessment type. Accordingly, the included examples are considered illustrative in nature and should not necessarily be construed as limiting.

By facilitating the configuration of different security assessments, aspects of the present application improve the operation of hosted virtual machine instances and hosted virtual networks by identifying vulnerabilities related to compromised security information. Additionally, aspects of the present application improve the performance of monitoring services or configurations developed to prevent activities implemented by the security assessment.

FIG. 1 illustrates a general communication environment 100 for facilitating the implementation of network-based services by a service provider and the configuration of security assessment based on selected network-based service. The communication environment 100 includes a plurality of user devices 102 utilized by individual users, generally referred to as user devices, to request security assessments from a security assessment service 108.

User devices 102 may include any number of different computing devices capable of communicating with the communication network 120, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance, controller, digital media player, and the like. Each client computing device 102 may optionally include one or more data stores (not shown in FIG. 1) including various applications or computer-executable instructions, such as web browsers, used to implement the embodiments disclosed herein. Illustrative components of a user device 102 will be described with regard to FIG. 2.

Network 120 may be any wired network, wireless network, or combination thereof. In addition, the network 120 may be a personal area network, local area network, wide area network, cable network, satellite network, cellular telephone network, or combination thereof. In the example environment of FIG. 1, network 120 is a global area network ("GAN"), such as the Internet. Protocols and components for communicating via the other aforementioned types of communication networks are well known to those skilled in the art of computer communications and thus, need not be described in more detail herein. While each of the user devices 102 are depicted as having a single connection to the network 120, individual components of the user devices 102 may be connected to the network 120 at disparate points. Accordingly, communication times and capabilities may vary between the components of FIG. 1.

In accordance with embodiments, the virtualization and management services 104 includes a set of physical computing devices for providing a production virtualization environment 108. Illustratively, the production virtualization environment 108 includes a variety of components utilize to host one or more virtual machine instances having a dedicated function and one or more hosted virtual networks made up of a number of hosted virtual machine instances. As will be described below, the production virtualization environment 108 includes security monitoring services or components for mitigating security vulnerabilities, such as compromised security information. The virtualization and management services 104 also includes a set of physical computing devices for providing a testing virtualization environment 110 in which one or more of hosted virtual machine instances or hosted virtual networks can be implemented to allow for the execution of security assessments. Although illustrated as singular environments, one skilled in the relevant art will appreciate that such a depiction is logical in nature and that each of the environments 108, 110 may be implemented in any number of components across multiple physical computing devices, The virtualization execution and management services 104 can further include security assessment service 106 and security data store 112 for receiving requests to implement security assessments based on provided security information (e.g., emulating compromised security information) and targeting specific virtual machines instances/virtual networks being implemented on the production virtualization environment 108. The security assessment service 106 can further generate processing results that can be utilized to provide summaries regarding the execution of the security assessments, performance of security monitoring or mitigation services and a result of the hosted virtual machine(s) and networks.

It will be appreciated by those skilled in the art that the virtualization execution and management services 104 and illustrated components may have fewer or greater components than are illustrated in FIG. 1. Thus, the depiction of the virtualization execution and management services 104 in FIG. 1 should be taken as illustrative. For example, in some embodiments, components of the security assessment service 106 may be executed by one more virtual machines implemented in a hosted computing environment. A hosted computing environment may include one or more rapidly provisioned and released computing resources, which computing resources may include computing, networking or storage devices.

Figure 2:
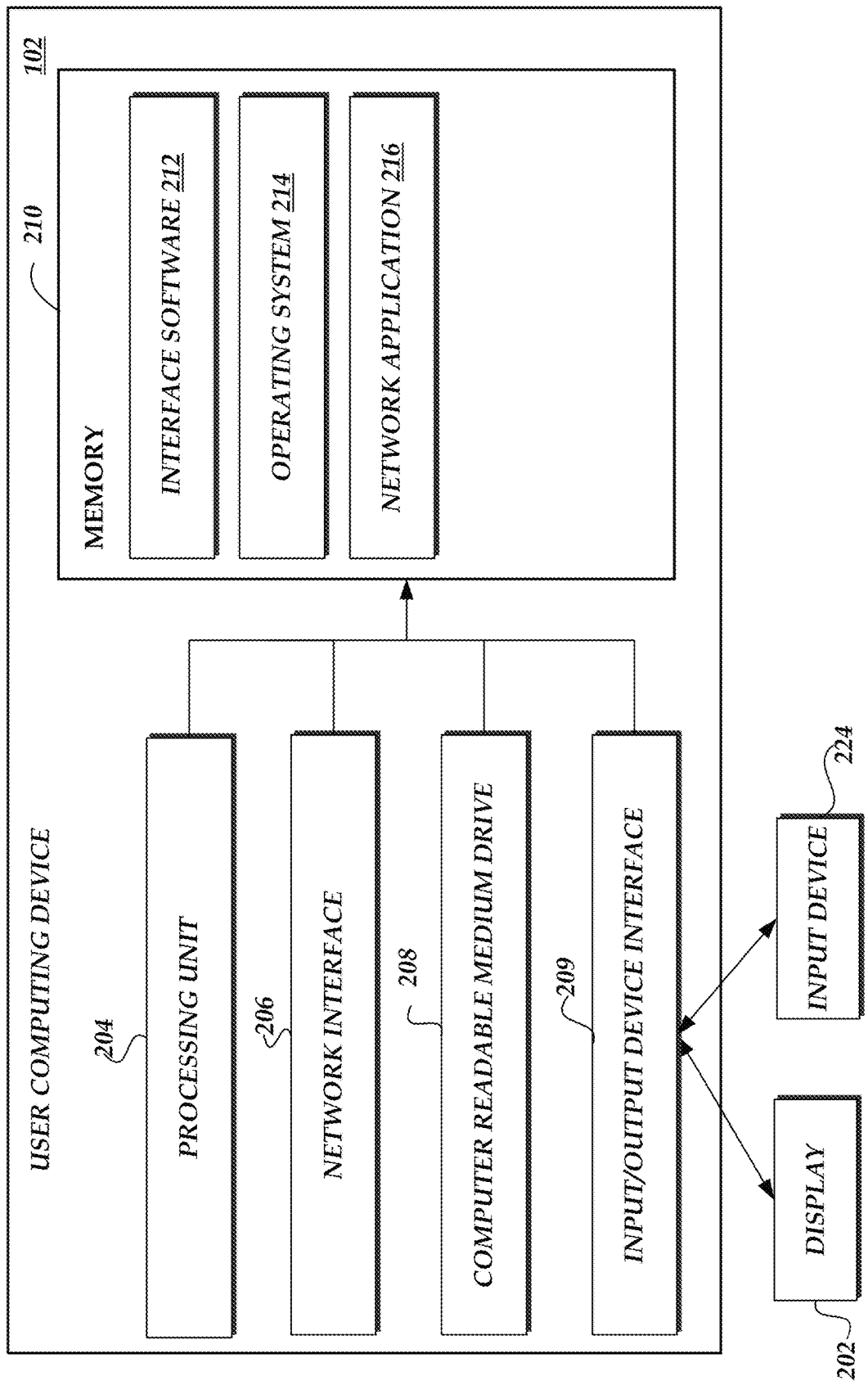
FIG. 2 is a block diagram of illustrative components of a user device configured to request and configure security assessments in accordance with some embodiments.

FIG. 2 depicts one embodiment of an architecture of an illustrative user device 102 that can generate content requests in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, a computer readable medium drive 208, an input/output device interface 209, an optional display 202, and an input device 224, all of which may communicate with one another by way of a communication bus.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for requesting and configuring the implementation of one or more security assessments. For example, in one embodiment, the memory 210 includes a network application 216, such as browser application, for accessing and communicating with the security assessment service 106.

Figure 3:
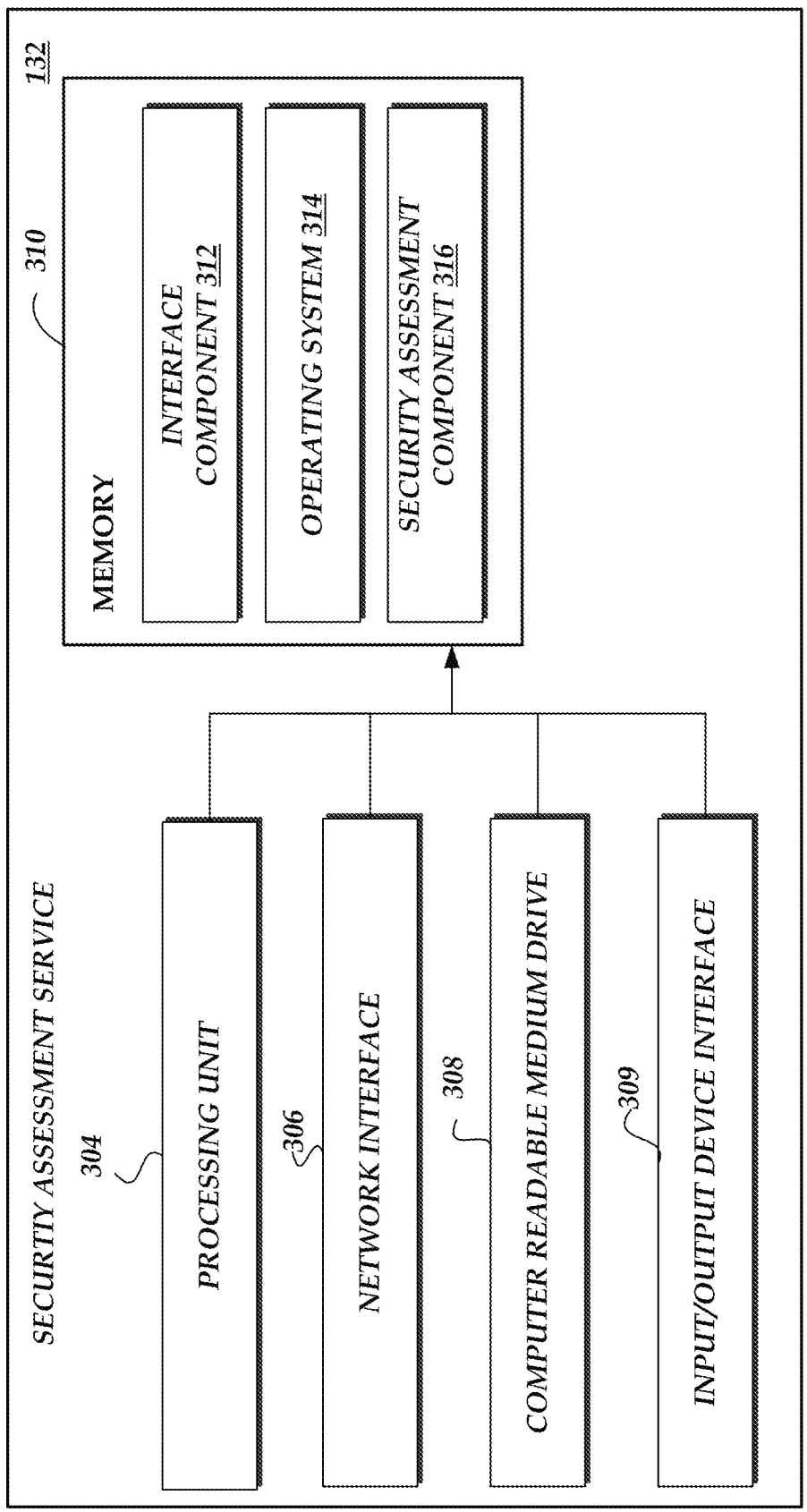
FIG. 3 is a block diagram of illustrative components of a security assessment service configured to process requests for security assessments, configure and executed selected security assessments and generate processing results.

FIG. 3 depicts one embodiment of an architecture of an illustrative security assessment service 106 for facilitating security assessments as described herein. The general architecture of the security assessment service 106 depicted in FIG. 3 includes an arrangement of computer hardware and software components that may be used to implement aspects of the present disclosure. As illustrated, the security assessment service 106 includes a processing unit 304, a network interface 306, a computer readable medium drive 308, an input/output device interface 309, all of which may communicate with one another by way of a communication bus. The components of the security assessment service 106 may be physical hardware components or implemented in a virtualized environment.

The network interface 306 may provide connectivity to one or more networks or computing systems, such as the network 120 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the security assessment service 106 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the security assessment service 106. The memory 310 may further include computer program instructions and other information for implementing aspects of the present disclosure. For example, in one embodiment, the memory 310 includes interface software 312 for receiving and processing content requests from user devices 102 or requesting implementation of a testing environment from the testing virtualization environment 110. Memory 310 includes a security assessment component 316 for identifying available security assessments, processing and configuring security assessments, collecting processing results, and providing summaries of the security assessments.

Figure 4A:
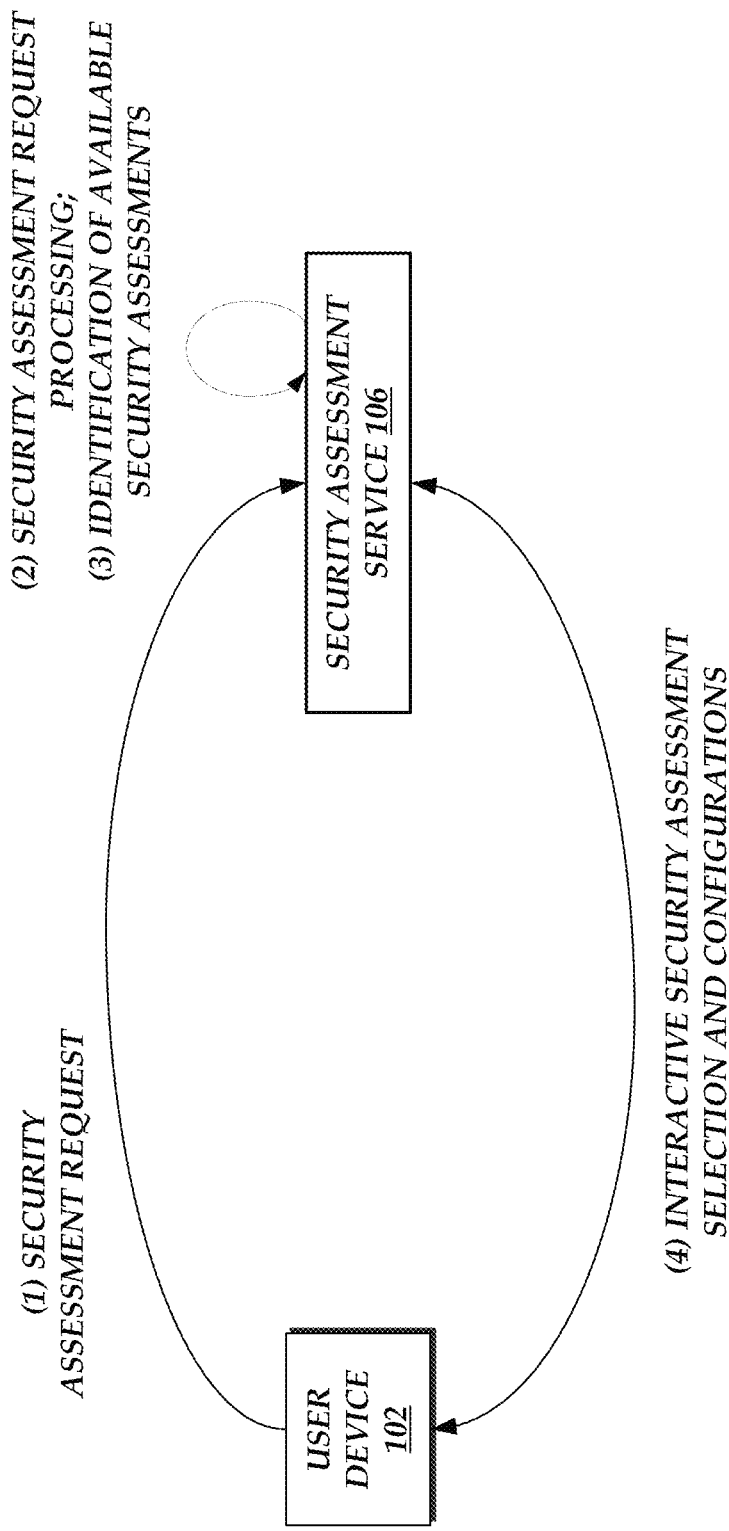
FIGS. 4A and 4B are block diagrams of the communication environment of FIG. 1 illustrating the selection, configuration, and execution of security assessments in accordance with an illustrative embodiment.
Figure 4B:
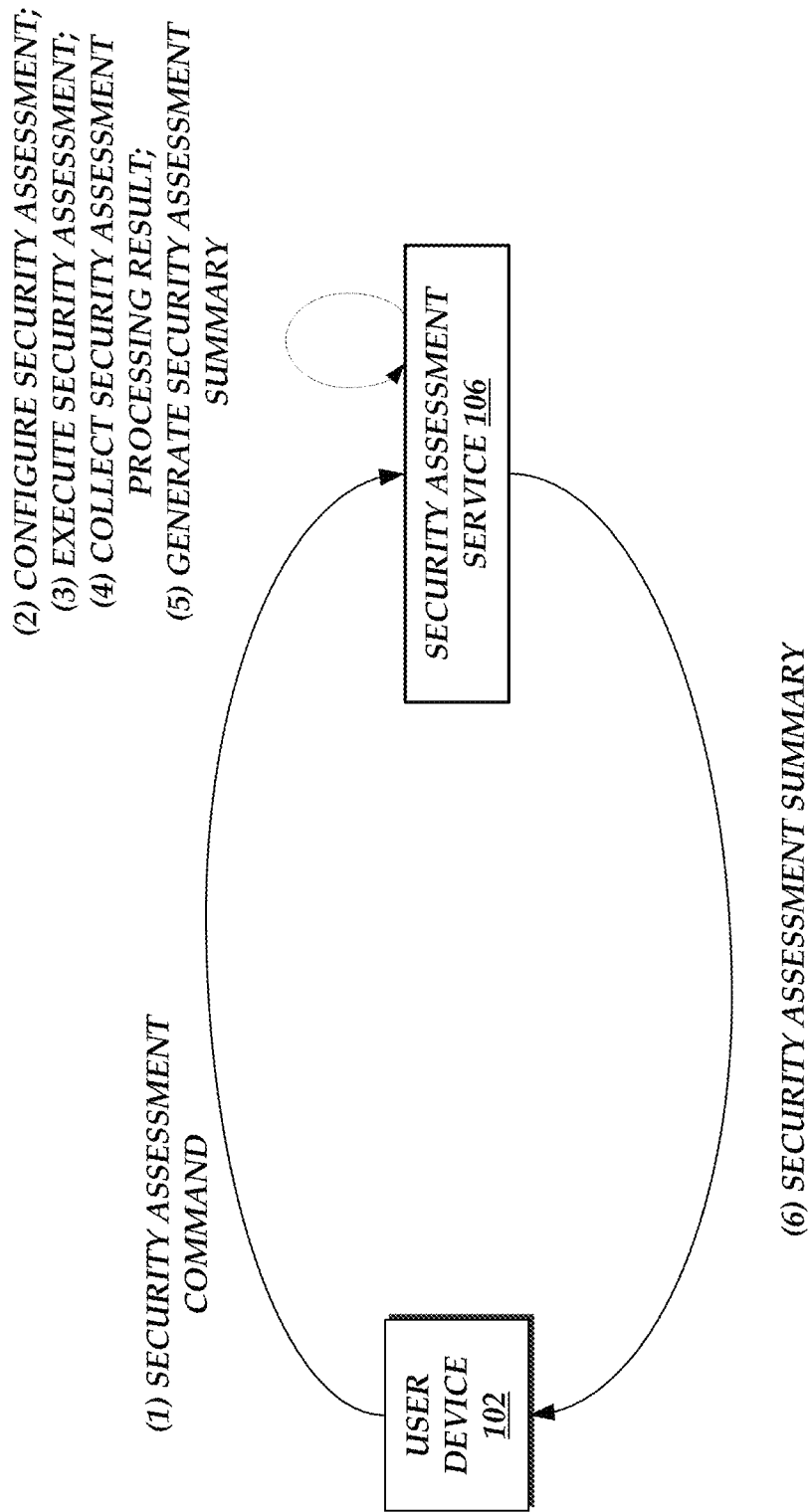

Turning now to FIGS. 4A-4B, an illustrative interaction for the selection and configuration of security assessments will be described. For purposes of illustration, FIGS. 4A-4B illustrate interaction between a user device 102 and the security assessment service 106. Such interaction is representative in nature and could include a number of additional components or interactions. For example, reference to execution of the security assessment could involve any number of components of a production virtualization environment 108 or testing virtualization environment 110

With reference to FIG. 4A, at (1), the user device 102 transmits a security assessment request. Illustratively, as described above, the security assessments relate to utilization of security information, such as user identifiers, passwords, or other credentials that will simulate the potential impact on a virtual machine instance or hosted virtual network if the provided security information were compromised. The transmission of the request can further include any number of additional credentials or information utilized by the security assessment service 106 to validate the request. Still further, the request may be transmitted in accordance with various networking protocols, including security protocols utilized to increase the security of the transmissions.

At (2), the security assessment service 106 processes the security assessment request and identifies available security assessments at (3). Illustratively, the security assessment service 106 can utilize the information in the security assessment request to identify the specific hosted virtual networks or virtual machine instances in the production virtualization environment 108 and determine specific attributes/configurations. For example, the security assessment service 106 can identify how security information is processed, what type of security monitoring is available or is enabled, results of previous vulnerability assessments and the like. Additionally, the security assessment service 106 can determine specific account or configuration information associated with the requesting user that can affect eligibility of security assessments. For example, account settings/configurations associated with the user may define that specific security assessments may be not be available, set limits as to the types or number of security assessments that can be performed, and the like. In such embodiments, the security assessment service 106 can filter out or eliminate security assessments that cannot be implemented or that are otherwise unavailable based on the security assessment request.

Figure 5:
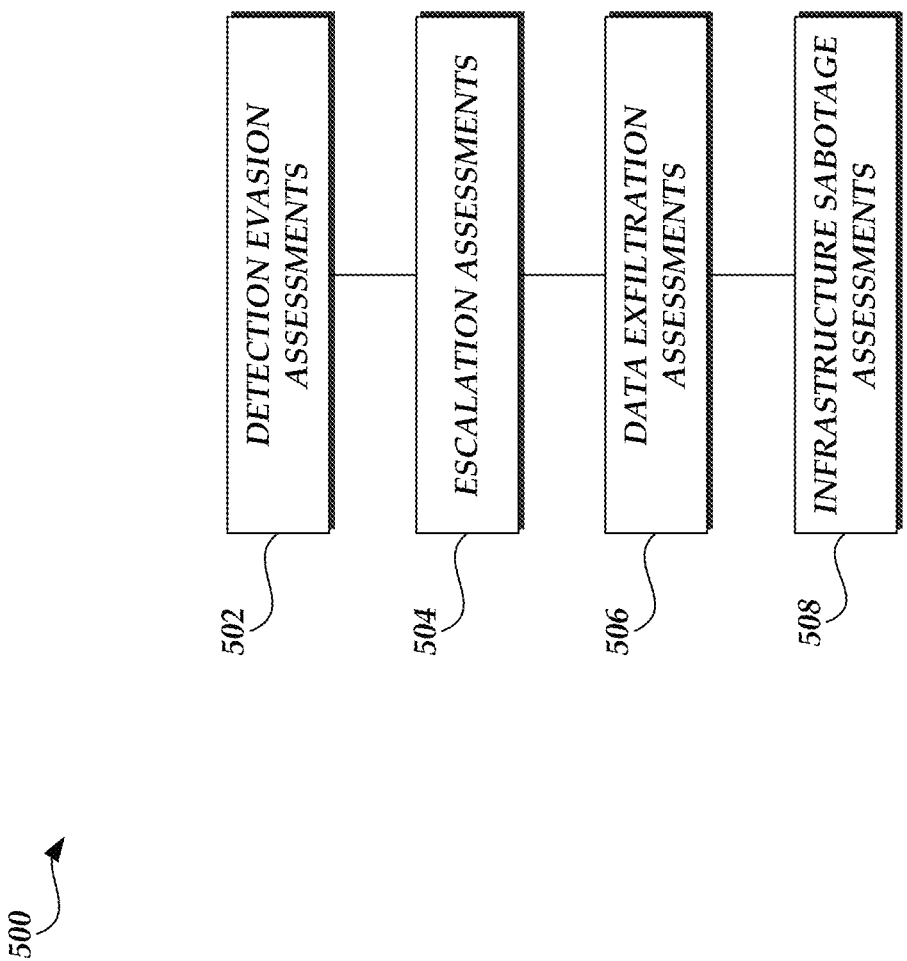
FIG. 5 is a block diagram illustrative of a security assessment type information.

At (4), the security assessment service 106 and user device 102 can engage in interactive security assessment selection and configuration interaction. As will be described with regard to FIG. 5, illustratively security assessments related to security information can be associated with a number of types or techniques that encompass multiple (or a set of) groupings of actions that cumulatively are associated with a specific assessment. Such types or techniques include detection and evasion techniques, escalation techniques, data exfiltration techniques, and infrastructure techniques. Additionally, the configuration of the set of security assessments can include the specification of an order of implementation of a plurality of security assessments and timing information associated with the individual implementation of the plurality of security assessments. Such order and timing information can be characterized as a workflow that can be managed by the security assessment service 106.

Each of the types or higher-level techniques can be represented in various visual displays that facilitate the selection of a desired type or technique and the selection of individual of grouping of actions that form a specific security assessment for a selected type. Additionally, the visual displays can further include controls or other visual objects that facilitate that combination of specific actions, the specification of timing or ordering information (e.g., a timeline representation of selected security assessments representative of order and timing), or the configuration of additional configuration information required or available for a selected security assessment. Accordingly, the interaction illustrated FIG. 4A can include a series of interactions, inputs or collection of information utilized to select security assessments to be performed.

With reference to FIG. 4B, at (1), the security assessment service 106 receives a security assessment command. Illustratively, the security assessment command represents the selection of one or more security assessments and the instructions for the security assessment service 106 to begin execution. For example, the security assessment command can correspond to instructions to implement a workflow of set of security assessments. The transmission of the security assessment command may coincide with the selection of security assessments as illustrated in FIG. 4A (e.g., implementation corresponding to confirmation of the selection of the set of security assessments) or may be an independent transmission of a request to begin implementation.

At (2), the security assessment service 106 configures the selected security assessment. Illustratively, the security assessment service 106 can determine the parameters or configurations associated with the identified virtual machine instances or virtual network, the parameters and configurations associated with security monitoring services or other configurations/parameters. The security assessment service 106 can also identify the processing result(s) that will be measured and how the processing results will be measured. Such processing results can include a result generated by executing the security assessment, the performance/vulnerabilities of the identified security monitoring services, and resulting state/operating information of the identified virtual machine instances/virtual network. The security assessment service 106 further identify information utilized to form the summaries of the processing results. Still further, the security assessment service 106 can configure timing information related to the order of implementation of the set of security assessments, time gaps in between implementation of security assessments, or other information related to a specified workflow implementation (e.g., error conditions, branching conditions, etc.).

At (3), the security assessment service 106 executes or causes the execution of the identified security assessments. Illustratively, the security assessment service 106 can implement a copy of the identified virtual machine instances or hosted networks in the testing virtualization environment 110. In other embodiments, the security assessment service 106 can execute the security assessments on the virtual machine instances or virtual networks in the operation virtualization environment 108. Illustratively, the security assessments can include the executable code, such as scripts or other code, that can be implemented by the security assessment service 106. The executable code embodies the set of actions that define the specific security assessment (e.g., causing the generation of new identifiers). Illustrative examples of security assessments will be described with regard to FIG. 5.

At (4), the security assessment service 106 collects security assessment processing results. As previously described, the processing result can include a result generated by executing the security assessment, the performance/vulnerabilities of the identified security monitoring services, and resulting state/operating information of the identified virtual machine instances/virtual network. At (5), the security assessment service 106 generates security assessment summaries. Illustratively, the summaries can include excerpts from the processing results, characterizations of the processing results, notifications, escalation information, and the like.

As described with regard to FIG. 4A, illustratively security assessments related to security information can be associated with a number of types or techniques that encompass multiple (or a set of) groupings of actions that cumulatively are associated with a specific assessment. Each of the types or higher-level techniques can be represented in various hierarchical-based visual displays that facilitate the selection of a desired type or technique and the selection of individual of grouping of actions that form a specific security assessment for a selected type. Additionally, the visual displays can further include controls or other visual objects that facilitate that combination of specific actions, the specification of timing or ordering information, or the configuration of additional configuration information required or available for a selected action. As described above, a selection of multiple security assessment techniques can include the selection of order and timing information related to the implementation of a plurality of security assessments.

FIG. 5 illustrates a block diagram of four illustrative general techniques or types of security assessments that can be implemented by the security assessment service 106. Each technique/type generally represents a number of specific security assessments that correspond to the types. As shown in FIG. 5, the four types/techniques include detection and evasion techniques 502, escalation techniques 504, data exfiltration techniques 506, and infrastructure techniques 508. For purposes of illustration, exemplary variations under each type will be described. However, it should be noted that such as examples are not intended to be limiting. Additionally, as described above, in some situations, specific security assessments may not be available based on the controls or permissions of the security information (e.g., the security credentials limit creation of new users).

With reference first to the detection and evasion techniques 502, a number of illustrative specific security assessments will be described in which the grouping of actions attempt to emulate techniques by which an attack utilizing security information can be further or maintained by attempting to evade detection by a security monitoring service. In one aspect, the security assessment corresponds to leveraging the submitted security information to assume an administrative role in the system under test-. Once the administrative role is set, the security assessment service 106 generates multiple service calls that facilitate or prolong vulnerabilities. In one example, the security assessment can correspond to generation of a set of service calls utilizing the security information in which the service calls relate to attacks on the system under test. As will be described below, the timing of the service calls can be metered to further avoid detection. In another example, the security assessment can correspond to generation a large number of service calls that includes a combination of non-threatening calls and threatening calls. The number of service calls can be defined according to a threshold, generally defined as a white noise threshold, that is selected in a manner that attempts to mask the threatening service calls based on exceeding the white noise threshold.

In another aspect, the security information can be utilized to replace default user-agents for software code and spoof/replace with a different or arbitrary agent that will facilitate or prolong vulnerabilities. This specific security assessment can be further configured to refresh the user-agent based on time, number of requests, etc. In still a further aspect, the security information can be utilized to replace regional designations for software calls in which regional designation are a parameter. In still a further aspect, the security information can be utilized to generate new users based on frequency of calls and then utilize the new user identifiers to make additional software calls. In still another aspect, the security information can be utilized to select federated users and switch identities. For the above aspects, the security assessment service 106 can implement rate control so that switching or hopping techniques are implemented on a max rate to avoid detection. In still further aspects, the security assessments can be configured to utilize proxies and tunneling to mask the security information. Still further, the security assessment service 106 can be configured to implement multiple detection evasion security assessments.

With reference now to the escalation assessments techniques 504, a number of illustrative specific security assessments will be described. In one aspect, the security assessment can be configured exfiltrate additional or alternative credentials based on modifying executable code that would otherwise restrict access to escalation of privileges. In a further aspect, the security assessment can be configured to utilize brute force password attacks for partial security information (e.g., user identifiers without password). The security assessment service 106 can include a set of known passwords to attempt to gain access. Illustratively, the techniques may be combined with the evasion techniques 502, such as combing brute force with rate control.

With reference now to the data exfiltration techniques 506, a number of illustrative specific security assessments will be described. In one aspect, the security assessment can utilize cross-regional replication to avoid detection from a single location making calls. Such techniques can utilize anonymous network calls. In another aspect, the security assessment can modify access permissions to allow for public access rights. This technique can be added with torrents to facilitate parallel reading.

With reference now to the infrastructure sabotage techniques 504, a number of illustrative specific security assessments will be described. In one aspect, the contents of a storage location can be exposed by modified policies of the contents within the storage location. In another aspect, the security assessment can expose role assumptions or federated roles to public access by modified permissions. In still a further aspect, the security assessment can modify password policies or set backdoor access.

Figure 6:
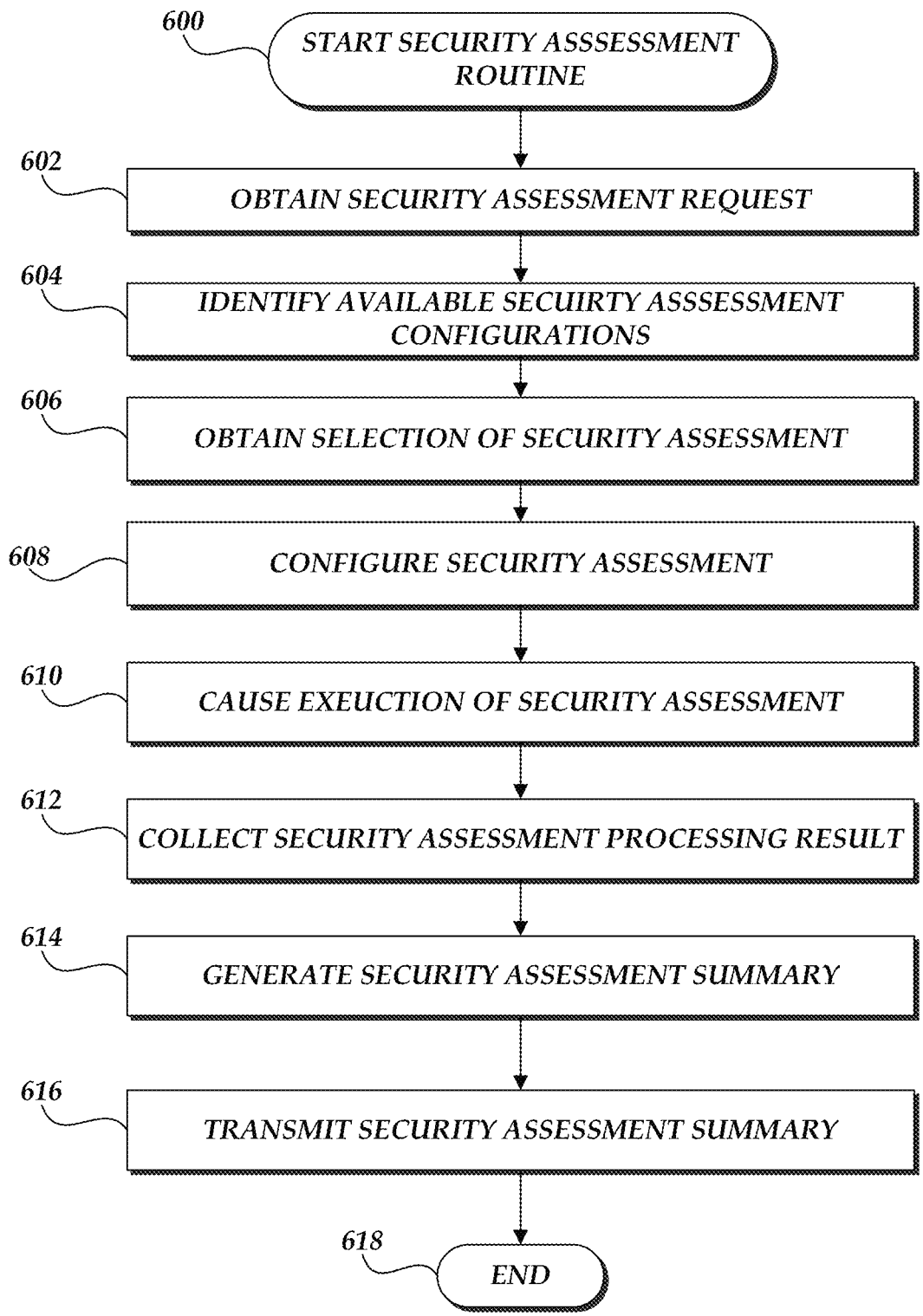
FIG. 6 is a flow diagram illustrative of security assessment processing routine implemented by security assessment service in accordance with some embodiments.

Turning now to FIG. 6, a routine 600 for implementing security assessments will be described. Illustratively, routine 600 will be described with regard to implementation by the security assessment service 106. At block 602, the security assessment service 106 obtains a security assessment request from the user device 102. As described above, the security assessments relate to utilization of security information, such as user identifiers, passwords, or other credentials that will simulate the potential impact on a virtual machine instance or hosted virtual network if the provided security information were compromised. The transmission of the security assessment request can further include any number of additional credentials or information utilized by the security assessment service 106 to validate access to the security assessment service 106 or validate that ability to configure the implementation of security assessments. Still further, the request may be transmitted in accordance with various networking protocols, including security protocols utilized to increase the security of the transmissions.

At block 604, the security assessment service 106 processes the security assessment request and identifies one or more security assessments that can be selected and configured to be implemented. Illustratively, the security assessment service 106 can utilize the information in the security assessment request to identify the specific hosted virtual networks or virtual machine instances in the production virtualization environment 108 and determine specific attributes/configurations. For example, the security assessment service 106 can identify how security information is processed, what type of security monitoring is available, results of previous vulnerability assessments and the like. Additionally, the security assessment service 106 can determine specific account or configuration information associated with the requesting user that can affect eligibility of security assessments. For example, account settings/configurations associated with the user may define that specific security assessments may be not be available, set limits as to the types or number of security assessments that can be performed, and the like. In such embodiments, the security assessment service 106 can filter out or eliminate security assessments that cannot be implemented or that are otherwise unavailable based on the security assessment request.

Illustratively, the security assessment service 106 and user device 102 can engage in interactive security assessment selection and configuration interaction. As described with regard to FIG. 5, illustratively security assessments related to security information can be associated with a number of types or techniques that encompass multiple (or a set of) groupings of actions that cumulatively are associated with a specific assessment. Such types or techniques include detection and evasion techniques, escalation techniques, data exfiltration techniques, and infrastructure techniques. Each of the types or higher-level techniques can be represented in various visual displays that facilitate the selection of a desired type or technique and the selection of individual of grouping of actions that form a specific security assessment for a selected type. Additionally, the visual displays can further include controls or other visual objects that facilitate that combination of specific actions, the specification of timing or ordering information, or the configuration of additional configuration information required or available for a selected action.

At block 606, the security assessment service 106 receives a security assessment selection. Illustratively, the security assessment selection represents the selection of one or more security assessments and the instructions for the security assessment service 106 to begin execution. The transmission of the security assessment command may coincide with the selection of security assessments as illustrated in FIG. 4A or may be an independent transmission of a request. As specified above, the configuration of the set of security assessments can include the specification of an order of implementation of a plurality of security assessments and timing information associated with the individual implementation of the plurality of security assessments. Such order and timing information can be characterized as a workflow that can be managed by the security assessment service 106.

At block 608, the security assessment service 106 configures the selected set of security assessments. Illustratively, the security assessment service 106 can determine the parameters or configurations associated with the identified virtual machine instances or virtual network, the parameters and configurations associated with security monitoring services or other configurations/parameters. The security assessment service 106 can also identify the processing result(s) that will be measured and how the processing results will be measured. Such processing results can include a result generated by executing the security assessment, the performance/vulnerabilities of the identified security monitoring services, and resulting state/operating information of the identified virtual machine instances/virtual network. The security assessment service 106 further identify information utilized to form the summaries of the processing results. Still further, the security assessment service 106 can configure timing information related to the order of implementation of the set of security assessments, time gaps in between implementation of security assessments, or other information related to a specified workflow implementation (e.g., error conditions, branching conditions, etc.).

At block 610, the security assessment service 106 executes or causes the execution of the identified security assessments. Illustratively, the security assessment service 106 can implement a copy of the identified virtual machine instances or hosted networks in the testing virtualization environment 110. In other embodiments, the security assessment service 106 can execute the security assessments on the virtual machine instances or virtual networks in the operation virtualization environment 108. Illustratively, the security assessments can include the executable code, such as scripts or other code, that can be implemented by the security assessment service 106. The executable code embodies the set of actions that define the specific security assessment (e.g., causing the generation of new identifiers).

At block 612, the security assessment service 106 collects security assessment processing results. As previously described, the processing result can include a result generated by executing the security assessment, the performance/vulnerabilities of the identified security monitoring services, and resulting state/operating information of the identified virtual machine instances/virtual network. At block 614, the security assessment service 106 generates security assessment summaries. Illustratively, the summaries can include excerpts from the processing results, characterizations of the processing results, notifications, escalation information, and the like. At block 616, the security assessment service 106 transmits the generated security assessment summary information. At block 618, the routine 600 terminates or the routine 600 repeats.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing security assessments comprising:
   one or more computing devices associated with a security assessment service for network-based services, wherein the security assessment service is configured to:
   receive a security assessment request, the security assessment request including security information that will be utilized in one or more security assessments and an identified hosted virtual network that will be the subject of the one or more security assessments;
   identify a plurality of applicable security assessments based on the security information and the identified hosted virtual network, wherein the plurality of applicable security assessments are organized into at least one of a detection and evasion type, an escalation type, a data exfiltration type, or an infrastructure sabotage type;
   obtain a workflow characterizing a specific order of implementing the identified plurality of security assessments, the workflow including first timing information related to timing between individual security assessments of the ordered security assessments and a plurality of second timing information, wherein each second timing information is related to timing during execution of code for implementation of each individual security assessment of the identified plurality of security assessments;
   obtain a selection of at least two security assessments of the identified plurality of security assessments;
   cause execution according to the obtained workflow of the selected at least two security assessments in a testing environment corresponding to the identified hosted virtual network; and
   collect a processing result corresponding to the execution of the selected at least two security assessments.

2. The system of claim 1, wherein identifying the plurality of applicable security assessments includes selecting the plurality of security assessments.

3. The system of claim 2, wherein identifying the plurality of applicable security assessments includes selecting at least one of an order or timing of the implementation of the plurality of security assessments.

4. The system of claim 1, wherein the processing result includes at least one of a result of the security assessment, performance information associated with a security monitoring service or a resulting state of the hosted virtual network.

5. The system of claim 1, wherein the security assessment service is further configured to transmit a summary of the collected processing result.

6. The system of claim 1, wherein causing execution of the selected at least two security assessments in the testing environment includes creating a copy of the hosted virtual network in the testing environment.

7. A computer-implemented method for managing security assessments comprising:
   receiving a security assessment request, the security assessment request including security information that will be utilized in security assessments and an identified hosted virtual network that will be the subject of the security assessments;
   identifying a plurality of applicable security assessments based on the security information and the identified hosted virtual network, wherein the plurality of applicable security assessments are organized into at least one of a detection and evasion type, an escalation type, a data exfiltration type, or an infrastructure sabotage type;

obtaining a selection of at least two security assessments of the plurality of identified security assessments;

obtaining a workflow characterizing a specific order of implementing the selected at least two security assessments, the workflow including first timing information related to timing between individual security assessments of the selected at least two security assessments in the specific order, and a plurality of second timing information, wherein each second timing information is related to timing during code execution for implementation of individual security assessments of the selected at least two security assessments;

causing execution of the selected at least two security assessments according to the obtained workflow in a virtualization environment corresponding to the identified hosted virtual network; and collecting a processing result corresponding to the execution of the selected at least two security assessments.

8. The computer-implemented method of claim 7, wherein identifying the plurality of security assessments includes a generation of transmissions from multiple accounts using the security information.

9. The computer-implemented method of claim 7, wherein identifying the plurality of security assessments includes generating a series of software calls using the security information.

10. The computer-implemented method of claim 9, wherein identifying the plurality of security assessments includes rate limiting the series of software calls based on a maximum threshold.

11. The computer-implemented method of claim 9, wherein generating the series of software calls utilizing the security information includes generating a series of software calls exceeding a white noise threshold.

12. The computer-implemented method of claim 7, wherein identifying the plurality of security assessments includes generating additional or alternative user identifiers based on the security information.

13. The computer-implemented method of claim 7, wherein identifying the plurality of security assessments includes modifying at least one of a permission or policy associated with content.

14. The computer-implemented method of claim 7, wherein causing execution of the selected at least two security assessments in the virtualization environment includes causing execution of the selected at least two security assessments in at least one of a production or testing environment.

15. The computer-implemented method of claim 14, wherein causing execution of the selected at least two security assessments in the testing environment includes creating a copy of a hosted virtual network in the testing environment.

16. The computer-implemented method of claim 7 further comprising transmitting a summary of the collected processing result.

17. Non-transitory computer-readable media comprising instructions for managing security assessments, wherein the instructions, when executed on a computing system, cause the computing system to:

receive a security assessment request, the security assessment request including security information that will be utilized in one or more security assessments and an identified hosted virtual network that will be the subject of the one or more security assessments;

identify a plurality of applicable security assessments based on the security information and the identified hosted virtual network, wherein the plurality of applicable security assessments are organized into at least one of a detection and evasion type, an escalation type, a data exfiltration type, or an infrastructure sabotage type;

obtain a security assessment workflow characterizing a specific order of implementing the identified plurality of security assessments, the security assessment workflow including first timing information related to timing between individual security assessments of the identified plurality of security assessments in the specific order and a plurality of second timing information, wherein each second timing information is related to timing during execution of script for implementation of each individual security assessments of the identified plurality of security assessments;

obtain a selection of at least two security assessments of the identified plurality of security assessments;

cause execution according to the obtained workflow of the selected at least two security assessments in a testing environment corresponding to the identified hosted virtual network; and collect a processing result corresponding to execution of the selected at least two security assessments.

18. The non-transitory computer-readable media of claim 17 further comprising instructions that, when executed on the computing system, cause the computing system to generate a summary of the collected processing result.

19. The non-transitory computer-readable media of claim 17 further comprising instructions that, when executed on the computing system, cause the computing system to filter available security assessments for selection based on the security information.

* * * * *